March 22, 1938.　　A. SARGENT ET AL　　2,112,221
VENTILATING AND AIR TREATING UNIT
Filed June 3, 1933　　3 Sheets-Sheet 1
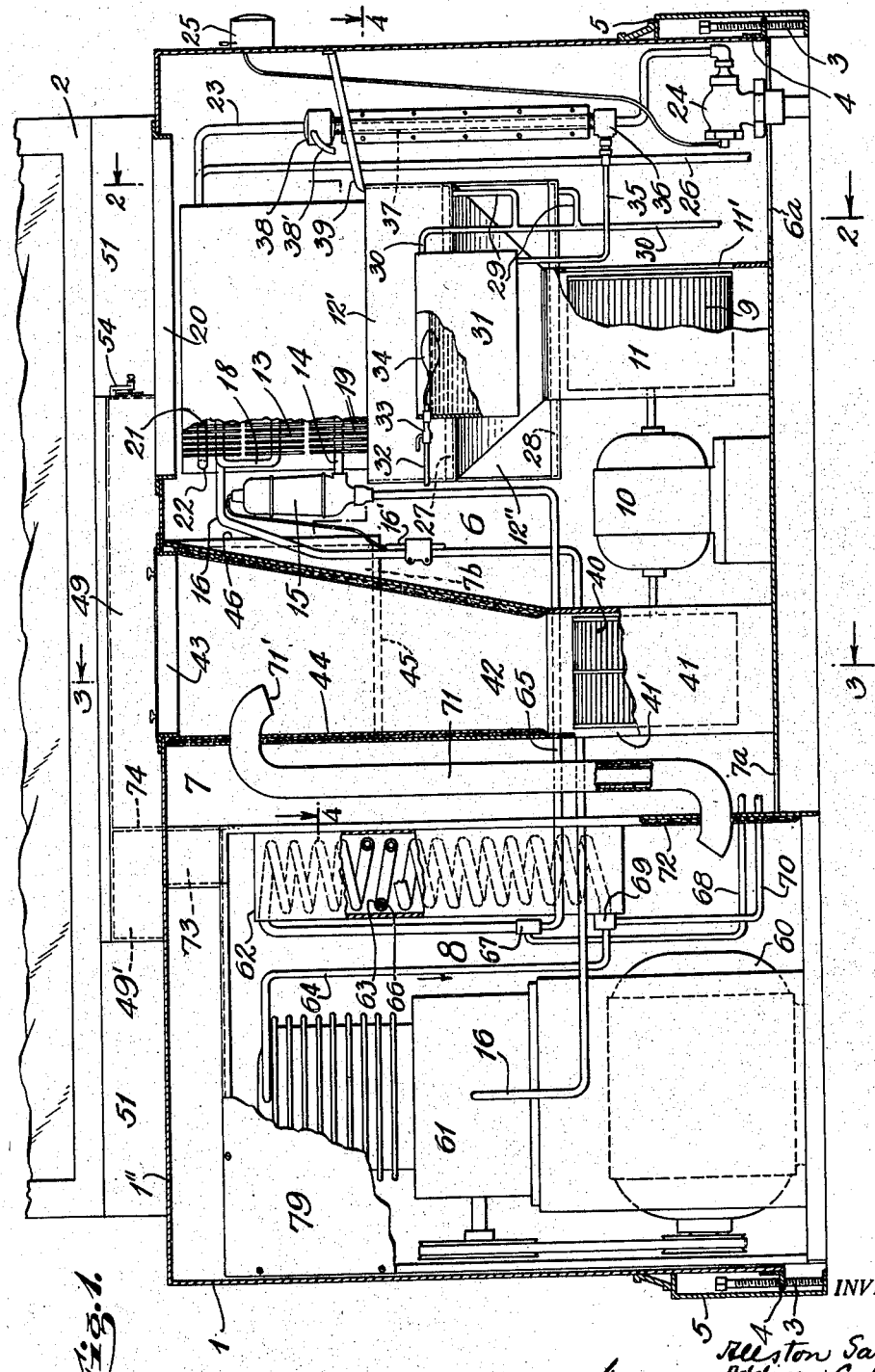

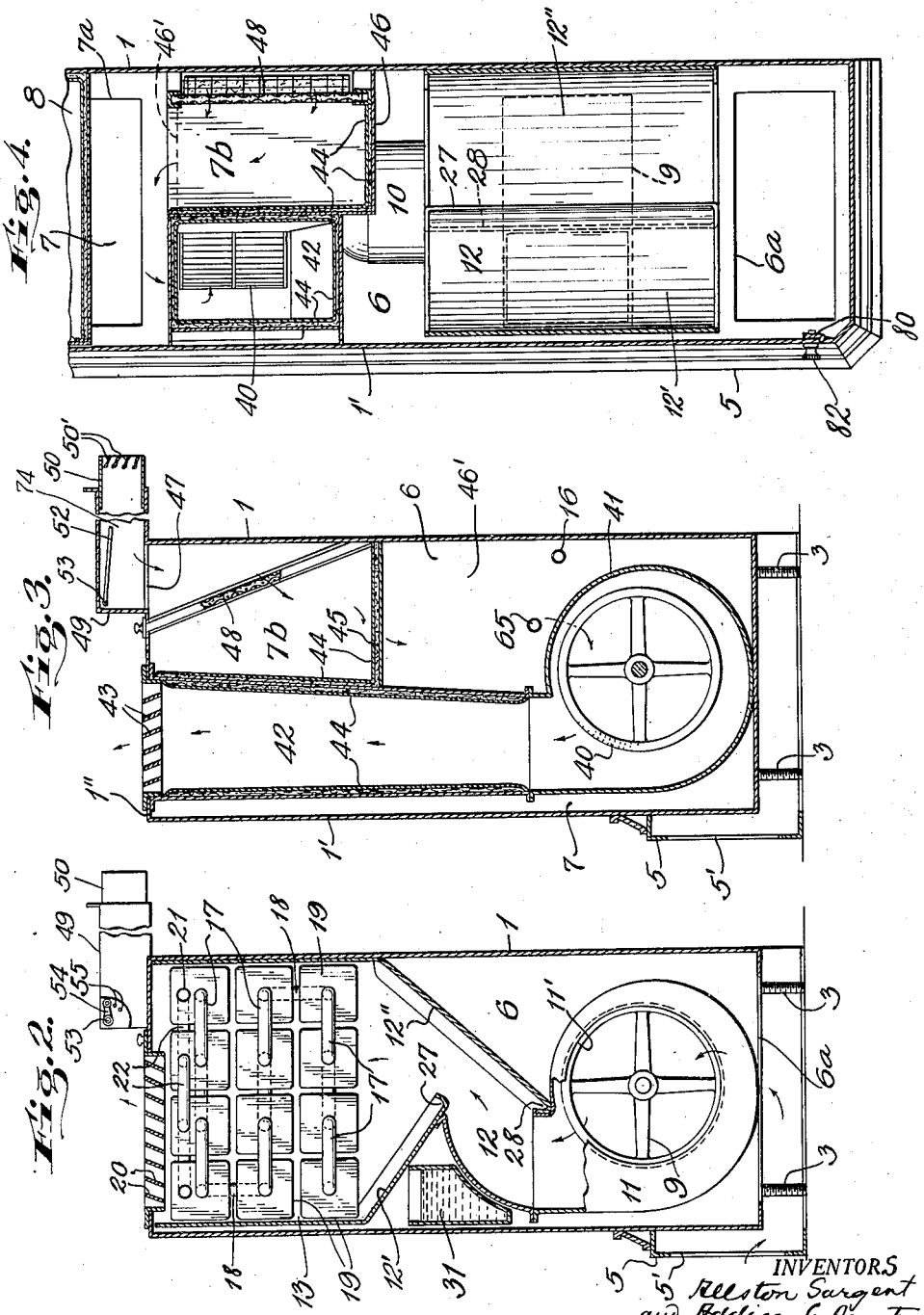

March 22, 1938. A. SARGENT ET AL 2,112,221
VENTILATING AND AIR TREATING UNIT
Filed June 3, 1933 3 Sheets—Sheet 3
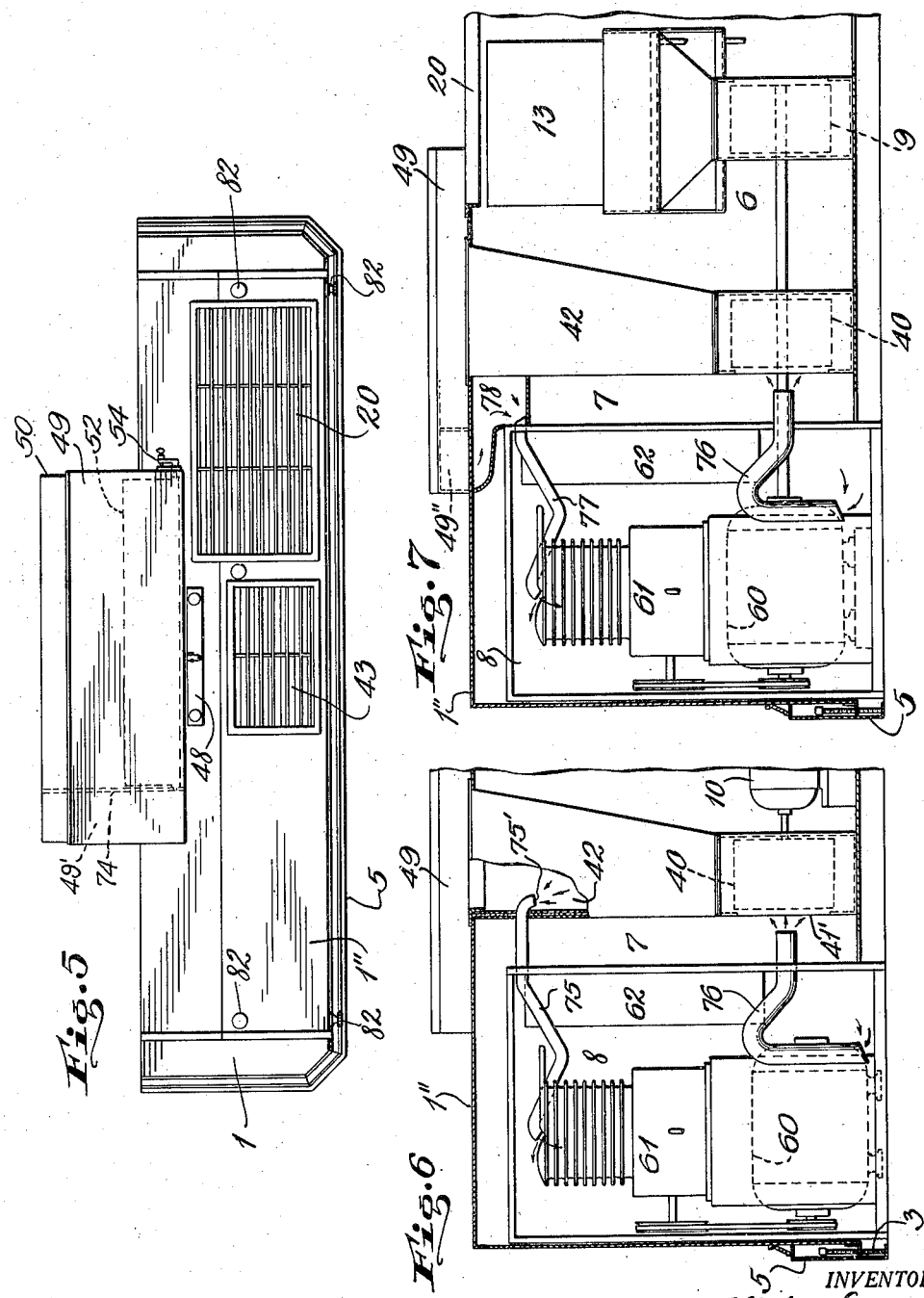

Patented Mar. 22, 1938

2,112,221

UNITED STATES PATENT OFFICE 2,112,221

VENTILATING AND AIR TREATING UNIT

Allston Sargent, Bronxville, N. Y., and Addison C. Armstrong, Baltimore, Md., assignors to Campbell Metal Window Corporation, New York, N. Y., a corporation of Maryland Application June 3, 1933, Serial No. 674,187

18 Claims. (Cl. 62—129)

The general object of the present invention is to provide a compact and effective ventilating and air treating unit adapted for use in a room to modify the room atmospheric conditions in a manner conducive to the health and comfort of the room occupants, and adapted in particular for use adjacent a wall of the room beneath a window opening through which fresh air may be drawn into the unit.

The ventilating and air treating unit in its preferred form includes means for recirculating the room atmosphere and for conditioning the air recirculated by heating it when a room heating effect is desirable, and by cooling it when a room cooling effect is desirable, and by increasing its humidity under conditions in which the room air humidity may be undesirably low. The unit in its preferred form also includes means for supplying, filtering and delivering to the room fresh air drawn from the external atmosphere through the window opening with which the unit is associated. The unit in its preferred form also includes the refrigeration machinery-compressor, condenser, etc., for creating the refrigerating effect used in cooling the air when room air cooling is desirable.

Our invention is characterized by the fact that said unit is a compact structural unit adapted for ready installation in a room and capable of producing the above mentioned actions or effects. My invention is characterized by various novel and useful features of construction and arrangement contributing to the compactness and practical efficiency of the unit and to a desirably low inherent cost of manufacture thereof.

The various features of novelty which characterize our invention are pointed out with particularity in the claims annexed to and forming a part of this specification. For a better understanding of the invention, however, and the advantages possessed by it reference should be had to the accompanying drawings and descriptive matter in which we have illustrated and described preferred embodiments of the invention.

Of the drawings:

Fig. 1 is an elevation of a complete ventilating and air treating unit with portions broken away and in section;

Fig. 2 is a section on the line 2—2 of Fig. 1;

Fig. 3 is a section on the line 3—3 of Fig. 1;

Fig. 4 is a partial sectional plan on the line 4—4 of Fig. 1;

Fig. 5 is a plan view of the unit shown in Figs. 1–4;

Fig. 6 is a view taken similarly to Fig. 1 illustrating a portion of a modified form of unit; and Fig. 7 is a view similar to Fig. 6 illustrating another modification.

In the drawings referring first to the construction shown in Figs. 1–5, I represents the box-like casing body or main housing element of the unit which is generally rectangular in outline. The vertical height of the casing body is a little less than the usual distance between the floor level and the level of the sill of the window 2 with which the unit is associated. The length of the casing will ordinarily be about the same as or a little greater than the usual window width in office buildings or apartment houses of the better class. The width of the housing I, i. e., its horizontal dimension in a direction transverse to the plane of the window, is desirably small and ordinarily may and should be somewhat less than one-half the height of the casing. Because of its compactness and form the ordinary use of the unit does not greatly or objectionably reduce the available floor space in the room in which the unit is used.

As the vertical distance between the floor level and the level of the window sill is not a standard dimension but varies in different installations through a range of variation ordinarily confined to a few inches, the unit casing I is provided with simple and effective provisions for varying the height of the unit. To this end, the casing body I is supported on adjustable legs 3 or feet shown as formed by bolts passing through brackets or lugs 4 secured to the opposite end of the casing. By adjusting the screws or bolts 3 in the lugs 4, the top of the casing body can be brought to the desired level. The space between the bottom wall of the casing and the room floor forms an air distribution space from which room air is drawn into the casing body as hereinafter explained. The air passes from the room proper into the space beneath the casing body I through ports 5' in a bottom or baseboard member 5. The latter rests upon the room floor and comprises a main front portion and two end portions which extend along and overlap the lower portions of the front and end walls of the casing body I. The member 5 is advantageously made of metal, as is the casing I, and the member 5 is advantageously shaped and provided with internal flanges spacing its main vertical portion away from the casing body somewhat and thereby providing space for the legs 3 and lugs 4 which are concealed by the member 5. The front wall of the casing body is preferably in the form of a readily removable metal plate I' having an upper horizontal portion 1" forming a substantial portion of the top wall of the casing body.

Internally the casing body or housing 1 is divided into end compartments 6 and 8 and an intermediate compartment 7. In the preferred construction illustrated, the compartment 6 includes room air recirculating means and various air conditioning elements. The recirculation means in the compartment 6 comprises a fan or blower 9 carried by one end of the shaft of a motor 10 mounted on the bottom wall of the compartment 6. The fan or blower 9 is mounted in a fan casing 11 having an axial inlet 11' at one end of the fan to which air passes from an inlet opening 6a in the floor of the compartment 6. The fan casing has an upwardly directed outlet 12 in the upper portion of which is located a heat exchanger 13 interchangeably usable as an air cooling and as an air heating device. In the preferred construction illustrated, the heat exchanger 13 comprises a pipe 14 receiving refrigerant fluid at one end from an expansion valve 15 and connected at its other end to a refrigerant return pipe 16. The expansion valve 15 may well be automatically controlled in accordance with the temperature in the refrigerant line 16 by means including an expansion fluid thermometer bulb 16' in suitable heat conducting relation with the pipe 16.

Between its ends the pipe 14 is bent to provide a plurality of parallel side by side straight sections, and connecting horizontal and vertical return bend portions 17 and 18, respectively. In the particular arrangement shown there are three superposed rows of straight sections each row including four straight pipe sections all at the same level. The four straight pipe sections in each row are connected together in pairs by corresponding horizontal return bend portions 17, and the pipe section at one end of the intermediate row is connected to the subjacent straight section by a vertical return bend 18, and the pipe section at the other end of the intermediate row is connected to the pipe section directly above it by another vertical return bend 18. Each straight pipe section passes centrally through a multiplicity of transverse thin metal plates or fins spaced along the length of the section and welded thereto. The plates or fin members 19 are rectangular in outline and the plates 19 on adjacent straight pipe sections are arranged edge to edge and are separated from one another by a small distance only. The heat exchanger which is nearly as wide as the entire unit is thus rectangular in outline. Advantageously and as shown, the heat exchanger is located directly beneath the top wall of the casing body which is formed with an air outlet opening above the heat exchanger and in which a louver 20 is removably mounted. The spaces between the adjacent fin members 19 form narrow air flues extending horizontally across the heat exchanger, and from the top to the bottom of the latter. With the described construction and especially when the tube 14 and fin plates 19 are formed of good heat conducting material as copper, the heat transfer capacity of the heat exchanger is unusually and desirably high.

With a refrigerating fluid flowing through the pipe 14 the air passing through the heat exchanger will be cooled to a temperature below the dew point of the room air, so that under normal conditions water will continuously condense out of the air passing through the heat exchanger. To collect and dispose of such condensate the opposite side walls of the portion of the fan casing outlet passage 12 immediately beneath the heat exchanger are oppositely inclined so that a relatively short upper inclined portion 12' of one side and the lower longer inclined portion 12" of the opposite wall overlap and collectively receive the drip from all portions of the heat exchanger. The inclined wall portion 12' is provided at its lower edge with an upturned flange forming a gutter 27 and a gutter 28 is similarly formed at the lower edge of the inclined wall portion 12". Water collecting in the gutters 27 and 28 is passed to drainage or waste through branches 29 of a waste pipe 30.

For use as a heating radiator when room heating is needed some of the rows of fins 19 of the heat exchanger 13 are traversed by sections of a steam pipe 21 connected at the ends of the heat exchanger by return bends 22. As shown each of the sets of fins in the upper row of such fins is thus traversed by a corresponding section of the pipe 21. The inlet end of that pipe receives steam through a steam supply pipe 23, which includes a control valve 24 which may advantageously be automatically controlled by an automatic thermostatic controller 25 responsive to room temperature which may be of any usual or suitable form. The outlet end of the pipe 21 is connected to the return pipe 26 of the steam heating system.

When steam is passed through the pipe 21 of the heat exchanger 13 to produce a room air heating effect, the usual need for artificial humidification of the room air will be experienced and suitable humidifying means are preferably located in the compartment 6. Any of various forms of humidifying apparatus may be employed for the purpose. The particular humidifying apparatus shown in Fig. 1 is especially well adapted for such use because of its compactness and operating characteristics. The form of humidifying apparatus shown in Fig. 1 comprises a water reservoir 31 receiving water from a supply pipe 32 through a valve 33 controlled by a float 34 to normally maintain a water level in the reservoir 31 as indicated. The previously mentioned drain or waste pipe 30 serves as an overflow pipe limiting the maximum water level in the reservoir. The reservoir 31 supplies water through a pipe 35 to the inlet chamber 36 of an evaporating element which includes an annular water space 37 of small horizontal cross section surrounding a vertical portion of the steam supply pipe 23. The said water space is connected at its upper end to a steam and water separating chamber 38 at a level appreciably above the water level in the reservoir 31.

Steam or vapor formed in the evaporating element escapes from the chamber 38 through the discharge pipe 38'. The latter also discharges water when the water level in the evaporative element rises to the level of the inlet end of pipe 38' as a result of the vigorous ebullition in the water space 37 which may occur when the heating effect required and the resultant steam flow through the pipe 23 are substantial. The water discharged through the pipe 38' might be returned to the reservoir 31, but as shown is discharged onto a gutter or baffle member 39 over which it flows into one or the other of the previously mentioned gutters 27 and 28. As shown the water discharged by the baffle 39 enters the gutter 27 and passes to waste through the pipe 29. The steam or vapor discharged through pipe 38', and liberated from the water trickling down over the baffle 39, mixes with the air in the compartment 6 and passes into the fan casing either through the inlet 11' or into the upper portion of the discharge conduit 12 which in its upper portion is not closed at its ends.

The fresh air supply and filtering provisions in the compartment 7 include a fan or blower 40 at the opposite side of the motor 10 from the fan 9 and carried on the corresponding end of the motor shaft. The fan 40 is mounted in a fan casing 41 having an axial inlet 41' at the end of the fan remote from the motor 10, and having an upwardly direct discharge passage shown in the form of a duct 42 which discharges air into the room through an opening in the top wall of the casing body 1 in which a louver 43 is removably mounted. The conduit 42 is shown as containing sound absorbing material 44. The portion of the compartment 7 between the fan casing and the adjacent end of the compartment 8 receives room air through an opening 7a in the bottom wall of the casing body 1, and may also receive fresh air from a chamber 7b back of the discharge conduit 42, and open at its end facing the compartment 8, but separated from the compartment 6 by a horizontal partition wall 45 and by vertical partition walls 46 and 46', the latter uniting with the casing of fan 40 to separate the lower portions of the compartments 6 and 7. The compartment 7b receives air through an inlet opening 47 in front of which is an inclined air filter 48. The latter is removable for cleaning through the top wall of the casing body 1. In respect to its construction and mounting for removal, the filter 48 may follow the usual practice of the art and needs no further illustration or description. The partition walls 45, 46 and 46' are advantageously lined by sound absorbing material 44.

Fresh air coming from the external atmosphere comes to the inlet opening 47, which is in the top wall of the compartment 7, through an intake box 49 mounted on top of the casing body 1 and formed with a telescopic extension 50 adapted to extend between the partially raised lower sash of the window 2 and the window sill over which the box 49 and its extension 50 extend. Downwardly inclined louver plates 50' in the outer end of the extension 50 restrict the entrance of rain or snow. When, as is usual, the width of the box 49 and its extension 50 is somewhat less than the width of the window opening, the intake extension 50 passes through an opening in, or passes between sections of a barrier or flange-like member 51 which fills the portion of the opening in the window casing beneath the lower sash when the latter is raised as shown in Fig. 1. Means are advantageously provided for reducing or cutting off the inflow of external air through the intake box 49 as conditions may make it desirable, and in the construction illustrated, a damper 52 in the intake box 49 is provided for this purpose. As shown the shaft 53 to which the damper 52 is secured is extended through one end or side of the box 49 and externally of the latter, and is provided with an operating handle 54 which preferably is provided with a detent cooperating with one or another depression 55 formed in the box 49, or in a plate attached thereto, for releasably securing the damper in different predetermined adjustments.

In operation the fan 40 adds to the room air recirculating effect produced by the fan 9, but the room air drawn in by the fan 40 through the inlet 7a is not cooled or heated and humidified as is the air drawn through the inlet 6a by the fan 9. The air drawn in by the fan 40 from the room through inlet 7a and returned to the room through the fan discharge outlet 42 is conditioned, however, in the sense and to the extent that it is admixed with fresh air drawn from the external atmosphere through the intake box 49 and filter 47. By the use of suitable and suitably disposed sound absorbing material 44 the fresh air may be supplied to the room with little or no transmission of external noise into the room. The character and disposition of the sound absorbing material 44 desirably employed for this purpose need not be described herein, as in respect to the use of such material, the apparatus may follow the usual practice employed in the construction of the conventional silencer ventilators.

The compartment 8 includes refrigerating machinery which may be of any usual and suitably compact form. As shown the machinery in the compartment 8 comprises a motor 60, a compressor 61 belt driven by the motor 60 and a condenser 62. The latter, as shown, comprises a helically coiled pipe 63 connected at its inlet end to the compressor outlet 64 and connected at its other end to a pipe 65 running through the compartment 7 to the expansion valve 15 in the compartment 6. The pipe 63 is surrounded by a pipe 66 the internal diameter of which is somewhat greater than the external diameter of the pipe 63 so that the pipe 63 is surrounded by an annular cooling space. Cooling water is supplied to one end of said annular space through an inlet box 67 from a cooling water supply pipe 68. The water leaves said annular space at its opposite end through an outlet box 69 from which a drain pipe 70 extends.

In respect to the above mentioned features, the refrigerating apparatus in the compartment 8 may follow the usual practice of the art, but in accordance with the present invention provisions are made for effecting an air circulation through the chamber 8 primarily for the purpose of properly ventilating and cooling the motor 60. In the form shown in Fig. 1, the motor cooling air is supplied to the lower portion of the compartment 8 through a pipe 71 having its lower end extending through the partition wall 72 separating the compartments 7 and 8, and having its upper end extending into the upper portion of the discharge conduit 42 with its inlet 71' facing the fan 40, so that a portion of the air moved through the outlet passage 42 by the fan 40 will be diverted through the pipe 71 into the compartment 8. As relatively cool air is thus supplied to the lower end of the compartment 8, relatively warm air escapes from the top of the compartment 8 through an outlet passage 73. The latter is shown as communicating with the inner end of a discharge passage 49' formed in the intake box 49 and separated from the latter by a longitudinal partition 74. A similar partition may be provided in the extension 50 of the air intake box.

Other means for utilizing the fan 40 in creating a flow of ventilating air through the compartment 8 may be employed. For example, as shown in Fig. 6, air is supplied to the upper portion of the compartment 8 through a pipe 75 having its inlet end 75' disposed in the fan discharge passage 42, as the inlet end of pipe 71 is disposed in Fig. 1. In Fig. 6, however, the air discharged from the compartment 8 is returned to the inlet of the fan 40 by a pipe 76 having its inlet end open to the compartment 8 near the bottom of the latter and shown as having its discharge end adjacent the inlet 41' to the fan 40. While with the arrangement shown in Fig. 6 the heat carried out of the compartment 8 by the pipe 76 tends to increase the temperature of the room air, the amount of heat which needs to be so withdrawn from the chamber 8 is relatively small, and does not add significantly to the refrigeration effect needed to maintain the desired room temperature. In this connection it should be borne in mind that the bulk of the heat removed from the refrigerating apparatus is carried away by the water passed through the cooling fluid space of the water cooled condenser 62.

In the modification illustrated in Fig. 7 air is withdrawn from the compartment 8 through the pipe 76 by the fan 40, as in Fig. 6, but in Fig. 7 the pipe 77 replacing the pipe 75 of Fig. 6 differs from the latter in that it receives external air entering the apparatus through the intake box 49. In the particular arrangement shown in Fig. 7, the pipe 77 has its inlet end open to a special compartment 78 receiving external air from an intake passage 49" which may be identical in form with the outlet passage 49' of the construction shown in Fig. 1.

As shown the compartment 8 is provided with an individual front cover plate or removable wall 79 which is secured to the non-removable body portions 1 by screws which are accessible when the main front wall or cover plate 1' of the casing body 1 is removed. The plate 1' which forms a substantial portion of the top wall of the casing body as well as the front wall thereof, seats against flange or batten parts 80 carried by the adjacent fixed portions of the casing or housing 1. Advantageously the cover plate 1' is normally detachably secured in place by a few accessible screws or other connectors 82 so that the cover plate is readily removable. The louver members 20 and 43 which are normally seated in openings in the horizontal portion 1" of the cover plate 1 are advantageously made readily separable from the cover plate.

The general operation of the embodiments of the present invention illustrated herein will be fully apparent from the foregoing description. As will be apparent to those skilled in the art, the apparatus unit is adapted to perform all of the air treating and moving actions required for effective room ventilation and room air conditioning, and is believed to constitute the first unit having such capacity and adapted for ready incorporation in existing buildings as well as in new buildings. The unit is characterized, moreover, by its compactness and desirable spatial requirements so that its use decreases the room space available for other purposes but little more than does a simple radiator with its enclosure similarly positioned in the room in accordance with the usual practice.

In general it is desirable because of practical space utilization conditions, as well as from aesthetic considerations, that the unit should be symmetrically disposed with respect to the window with which it is associated. With the more usual unit and window dimensions this requires that the end of the unit should project similarly at the opposite sides of the window as shown in Fig. 1. With the middle one of the three compartments 6, 7 and 8 receiving fresh outside air through the box 49, it is readily possible to symmetrically dispose the latter and give it an adequate flow capacity while keeping its vertical dimension desirably small, since it may project somewhat over either or both of the end compartments without interfering with the main air flow through it into the central compartment 7. The arrangement of the fresh air moving means in the compartment 7 immediately adjacent the refrigerating machinery compartment 8 facilitates the use of such means in ventilating the compartment 8. It also facilitates the connection of the compartment 8 to the external atmosphere through a special passage 49' or 49" in the member 49 necessarily employed in connection with the compartment 7. The arrangement of the compartments 6 and 7 in end to end relation contributes to space economy since it permits the upper portion of the compartment 7 to overhang the lower portion of the compartment 6. As is plainly apparent, the proper disposition in the compartment 6 of the apparatus installed therein requires a length of the lower portion of the compartment 6 which is greater than is needed for the upper portion of the compartment, while the apparatus in the compartment 7 makes possible a length of the lower portion thereof less than that required for the upper portion of the compartment.

No claim is made herein on the special provisions including the gutters 27 and 28 and the inclined walls of the passage 12 associated with those gutters for collecting and disposing of water of condensation formed by the air cooling action of the air cooling device, as those features of the apparatus disclosed of themselves form no part of the present invention, but are included in the subject matter disclosed and claimed in the copending application of Harry E. Campbell, Serial No. 674,798, filed June 8, 1933 now Patent No. 2,059,086, granted October 27, 1936. No claim is made herein on the special humidifying means illustrated and described herein, as those means of themselves form no part of the present invention, but are included in the subject matter disclosed and claimed in the copending application of Harry E. Campbell, Serial No. 674,797, filed June 8, 1933.

While in accordance with the provisions of the statutes, we have illustrated and described the best forms of embodiment of our invention now known to us, it will be apparent to those skilled in the art that changes may be made in the form of the apparatus disclosed without departing from the spirit of our invention as set forth in the appended claims and that in some cases certain features of our invention may be used to advantage without a corresponding use of other features.

Having now described our invention, what we claim as new and desire to secure by Letters Patent is:

1. A ventilating and air treating unit adapted for room use and comprising in combination a casing adapted for placement adjacent the outer wall of a room beneath and in front of a window opening in said wall and having its top approximately at the window sill level, means within said casing dividing the latter into two end compartments and an intermediate compartment, means associated with said casing for the passage of external air into the intermediate compartment through the window opening, means including a fan and sound absorbing material in the last mentioned compartment for moving air out of the compartment into the room and for preventing the transmission of external noises into the room through said compartment, a cooling device in one of the end compartments for cooling the room air, and refrigeration means mounted in the other end compartment and supplying cooling fluid to said device.

2. A ventilating and air treating unit adapted for room use and comprising in combination a casing adapted for placement adjacent the outer wall of a room beneath and in front of a window opening in said wall with its top approximately at the window sill level, means within said casing dividing the latter into two end compartments and an intermediate compartment, means associated with said casing for the passage of external air into the intermediate compartment through the window opening, means including a fan and sound absorbing material in the last mentioned compartment for discharging air entering the compartment into the room and for preventing the transmission of external noises into the room through said compartment, a fan and a cooling device located in one of the end compartments for recirculating room air therethrough and for cooling the air, and refrigeration means mounted in the other end compartment for supplying cooling fluid to said device.

3. A ventilating and air treating unit adapted for room use and comprising in combination a narrow horizontally elongated casing adapted for placement adjacent the outer wall of a room beneath and in front of a window opening in said wall and having its top surface at approximately the window sill level, means within said casing dividing the latter into two end compartments and an intermediate compartment, said intermediate compartment being longer at its top than at its bottom, and one of said end compartments being correspondingly shorter at its top than at its bottom, means associated with said casing for the passage of external air into the intermediate compartment through the window opening, means including a fan and sound absorbing material in the last mentioned compartment for discharging air entering the compartment into the room and for preventing the transmission of external noises into the room through said compartment, a fan and air cooling device located in said one end compartment for recirculating room air therethrough and for cooling the air, and means mounted in the other end compartment for supplying cooling fluid to said device.

4. A ventilating and air treating unit adapted for room use and comprising in combination a narrow horizontally elongated casing adapted for placement adjacent the outer wall of a room beneath and in front of a window opening in said wall, and having its top approximately at the window sill level, means within said casing dividing the latter into two end compartments and an intermediate compartment, a flat elongated chambered member mounted on top of said casing and extending longitudinally of the casing over the intermediate compartment and adjacent portions of the end compartments and including a portion projecting away from the casing at its rear part and adapted to extend over the sill of said window and through the lower portion of the window opening to provide communication between the casing interior and the external atmosphere, means in one of said compartments for drawing external air through said chambered member and discharging it into the room, means including an air cooling device in another of said compartments for the recirculation and cooling of room air and refrigerating means in the third compartment for supplying cooling fluid to said cooling device.

5. A ventilating and air treating unit adapted for room use and comprising in combination a narrow horizontally elongated casing adapted for placement adjacent the outer wall of a room beneath and in front of a window opening in said wall, and having its top approximately at the window level, means within said casing dividing the latter into two end compartments and an intermediate compartment, a flat chambered member mounted on top of said casing and extending longitudinally of the casing over the intermediate compartment and adjacent portions of the end compartments and including a portion projecting away from the casing at its rear side and adapted to extend over the sill of said window and through the lower portion of the window opening and including side by side passages each adapted to provide communication between the casing interior and the external atmosphere, means in one of said compartments for drawing external air through one of said passages and discharging it into the room, means including an air cooling device in another of said compartments for the recirculation and cooling of room air, refrigerating means in the third compartment for supplying cooling fluid to said cooling device, and means including another of said passages moving air through said third compartment.

6. A ventilating and air treating unit adapted for room use and comprising in combination a casing adapted for placement adjacent the outer wall of a room beneath and in front of a window opening in said wall with its top approximately at the window sill level, means within said casing dividing the latter into two end compartments and an intermediate compartment, means associated with said casing for the passage of external air into one of said compartments through the window opening, means including a fan and sound absorbing material in the last mentioned compartment for discharging air entering the compartment into the room and for preventing the transmission of external noises into the room through said compartment, refrigerating means in another adjacent compartment, a connection between said compartments for the movement of air by said fan over said refrigerating means, and a fan and cooling device receiving cooling fluid from said refrigerating means located in the third compartment for recirculating and cooling room air.

7. A ventilating and air treating unit adapted for room use and comprising in combination a casing adapted for placement adjacent the outer wall of a room beneath and in front of a window opening in said wall and having its top approximately at the window sill level, means within said casing dividing the latter into two end compartments and an intermediate compartment, means associated with said casing for the passage of external air into one of said compartments through the window opening, means including a fan and sound absorbing material in the last mentioned compartment for moving air out of the compartment into the room and for preventing the transmission of external noises into the room through said compartment, means in another of said compartments for optionally heating or cooling the room air, and refrigeration means mounted in the third compartment for supplying cooling fluid to the air cooling means.

8. A room ventilating and air treating unit comprising a casing adapted for placement adjacent the wall of a room and in front of a window in said wall, means projecting away from the top of the casing and adapted to extend over the sill and through the lower portion of the window in front of which a unit is placed to establish communication between said casing and the external atmosphere, floor engaging supports for and vertically adjustable relative to the casing to bring the top of the latter into the desired relation with the window sill, and a base member adapted to rest on the room floor including uprising portions, front and end portions respectively engaging and overlapping the lower portions of the front and end walls of the casing, said uprising portions having inwardly extending flanges at their upper edges fitting against said front and end walls, and beneath said flanges being spaced away from said walls and formed with air ports, and said casing having one or more openings in its lower portion to receive room air coming to said openings through the said ports.

9. A ventilating and air treating unit adapted for room use and comprising in combination a casing adapted for placement adjacent the outer wall of a room beneath and in front of a window opening in said wall, means within said casing dividing the latter into a plurality of end to end compartments, a flat chambered member mounted on top of said casing and overlying a plurality of said compartments and including a portion projecting away from the casing at its rear side and adapted to extend over the sill of said window and through the lower portion of the window opening and including separate side by side passages, and ventilating and air treating means mounted in said casing, and including means for drawing external air through one of said passages into one of said compartments and discharging such air into the room, and means for moving air serially through another of said compartments and the second of said passages and discharging the last mentioned air into the external atmosphere.

10. A ventilating and air treating unit adapted for room use and comprising in combination a narrow horizontally elongated casing adapted for placement adjacent the outer wall of a room beneath and in front of a window opening in said wall, means within said casing dividing the latter into an intermediate compartment and compartments at opposite ends of the latter, means associated with said casing for the passage of external air into the intermediate compartment through the window opening, means including a fan in said intermediate compartment for discharging external air entering the latter into a room, refrigerating means in a compartment at one end of said intermediate compartment, and means through which said fan moves air through the compartment containing said refrigerating means to ventilate the latter, and means including a cooling device receiving cooling fluid from said refrigerating means and a second fan at the other end of said intermediate compartment for recirculating room air through the last mentioned compartment and for cooling the air therein, the compartment containing said cooling device being of greater length at its bottom than at its top, and said intermediate compartment being of greater length at its top than at its bottom.

11. A ventilating and air treating unit adapted for room use and comprising in combination a narrow horizontally elongated casing adapted for placement adjacent the outer wall of a room beneath and in front of a window opening in said wall, means within said casing dividing the latter into an intermediate compartment and two end compartments, means associated with said casing for the passage of external air into the intermediate compartment through the window opening, means including a fan in said intermediate compartment for discharging external air entering the latter into a room, refrigerating means in one of the end compartments, and means through which said fan moves air through the compartment containing said refrigerating means to ventilate the latter, and means including a cooling device receiving cooling fluid from said refrigerating means, and a second fan in the other end compartment for recirculating room air through the last mentioned compartment and for cooling the air therein, the compartment containing said cooling device being of greater length at its top than at its bottom, and said intermediate compartment being of greater length at its bottom than at its top.

12. A ventilating and air treating unit adapted for room use and comprising in combination a casing adapted for placement adjacent the outer wall of a room beneath and in front of a window opening in said wall, means within said casing dividing the latter into a plurality of compartments, means associated with said casing for the passage of external air into one of said compartments through the window opening, means including a fan in the last mentioned compartment and the delivery conduit thereof for discharging air entering the compartment into the room, means for moving air through an adjacent compartment comprising an air passage leading to the latter from said delivery conduit, and having an inlet within said conduit facing the direction of air flow therein.

13. A ventilating and air treating unit adapted for room use and comprising in combination a casing adapted for placement adjacent the outer wall of a room beneath and in front of a window opening in said wall, partition means within said casing providing three compartments therein, means including a cooling device in one of said compartments for the recirculation therethrough and the cooling therein of room air, means including a fan in another of said compartments for moving fresh air through the last mentioned compartment into the room and for creating an air flow through the third of said compartments, and refrigerating means in said third compartment subjected to a cooling effect by the air moving therethrough and supplying refrigerant fluid to said cooling device.

14. A ventilating and air treating unit adapted for room use and comprising in combination a casing adapted for placement adjacent the outer wall of a room beneath and in front of a window opening in said wall, means associated with said casing providing a passage for the flow of external air into one of said compartments through the window opening, the last mentioned compartment also having an inlet for room air, a fan within the last mentioned compartment drawing air from said passage and inlet and discharging air so drawn into the room, means in a second of said compartments for recirculating room air therethrough, a cooling device in the last mentioned compartment for cooling the air moving therethrough, and refrigerating means in the third of said compartments supplying cooling fluid to said cooling device.

15. A ventilating and air treating unit adapted for room use and comprising, in combination, a casing adapted for placement adjacent the outer wall of a room beneath and in front of a window in said wall and having its top approximately at the window sill level, means within said casing dividing the latter into two end compartments and an intermediate compartment, means associated with said casing and providing for the passage of external air into the intermediate compartment, means including a fan and sound-absorbing material in the last-mentioned compartment for moving air out of the compartment into the room and for preventing the transmission of external noises into the room through said compartment, a cooling device in one of the end compartments for cooling the room air, and refrigeration means mounted in the other end compartment and supplying cooling fluid to said device.

16. An air conditioning unit for rooms, comprising a casing adapted to be arranged adjacent an outside wall of a room and in front of a window in said wall; an outside air duct secured at one end to the upper part of said casing and extending rearwardly from the casing and adapted to extend over the sill of such window and communicate at its rear end with the external atmosphere through the lower part of the window opening; means for properly positioning the top of said casing and the rearwardly extending duct with respect to such window sill and window opening; said means comprising vertically adjustable supporting devices secured to the lower part of the casing and adapted to engage the floor of such room and to space the lower part of said casing from the floor; and a skirt or baseboard member surrounding the lower part of the sides and ends of the casing and adapted to rest on the floor of the room so as to conceal the supporting devices and close the space between the casing and the floor.

17. An air conditioning unit for rooms, comprising a casing adapted to be arranged adjacent an outside wall of a room and in front of a window in said wall with its top adjacent the level of the window sill; an outside air duct secured at one end to the upper and rear part of said casing and extending horizontally and rearwardly from the casing and adapted to extend over the sill of such window and communicate at its rear end with the external atmosphere through the lower part of the window opening; means for properly positioning the top of said casing and the rearwardly extending duct with respect to such window sill and window opening; said means comprising vertically adjustable supporting devices secured to the lower part of the casing and adapted to engage the floor of such room and to space the lower part of said casing from the floor; and a skirt or baseboard member surrounding the lower part of the sides and ends of the casing and adapted to rest on the floor of the room so as to conceal the supporting devices and close the space between the casing and the floor.

18. An air conditioning unit for rooms, comprising a casing adapted to be arranged adjacent an outside wall of a room and in front of a window in said wall; an outside air duct secured at one end to the upper part of said casing and extending rearwardly from the casing and adapted to extend over the sill of such window and communicate at its rear end with the external atmosphere through the lower part of the window opening; means for properly positioning the top of said casing and the rearwardly extending duct with respect to such window sill and window opening; said means comprising vertically adjustable supporting devices secured to the lower part of the casing and adapted to engage the floor of such room and to space the lower part of said casing from the floor; and a skirt or baseboard member having air ports formed therein and surrounding the lower part of the sides and ends of the casing and adapted to rest on the floor of the room so as to conceal the supporting devices and close the space between the casing and the floor; said casing having one or more openings in its lower portion to receive room air coming to said openings through said ports.

ALLSTON SARGENT.
ADDISON C. ARMSTRONG.